Patented Dec. 25, 1923.

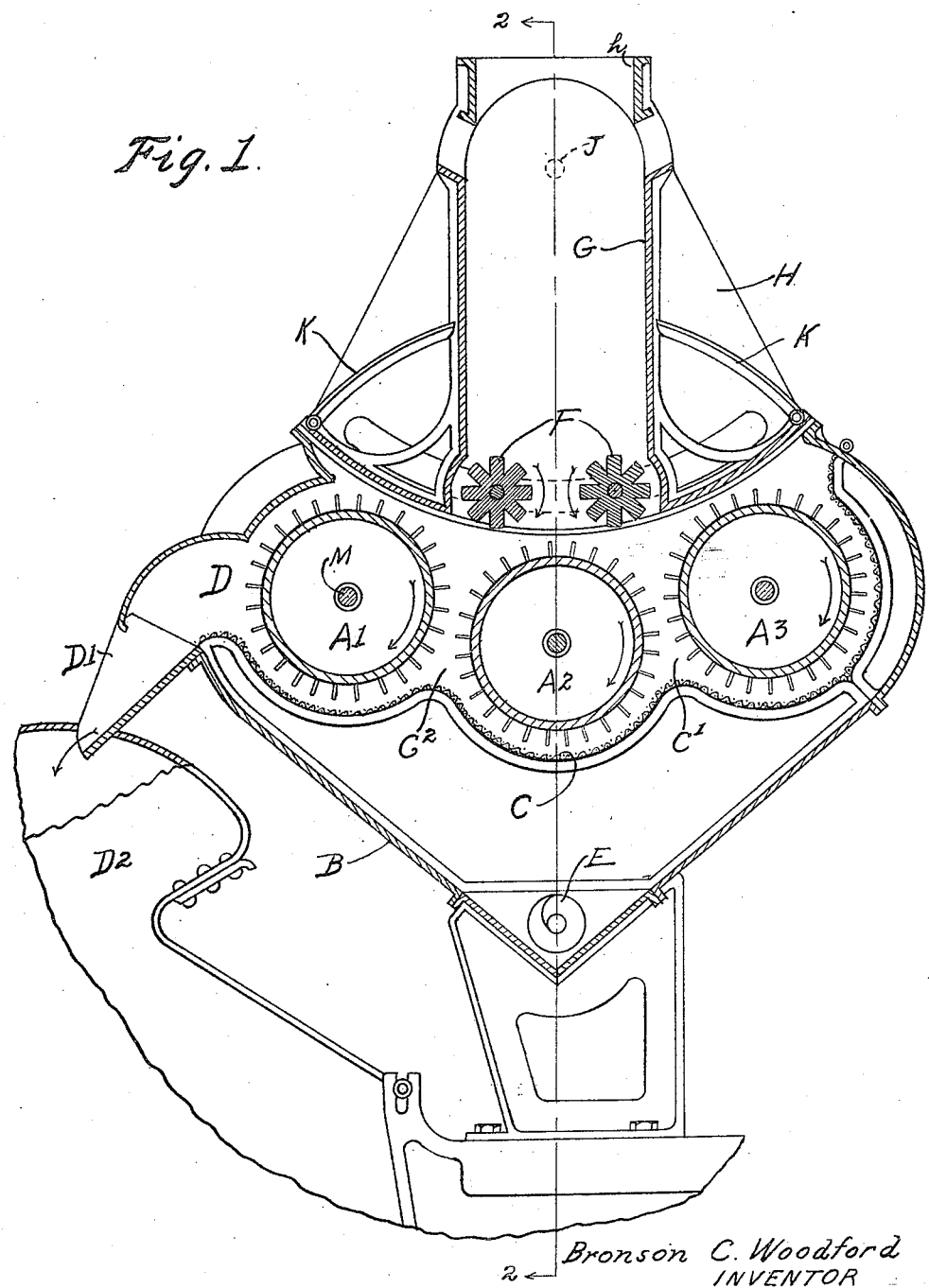

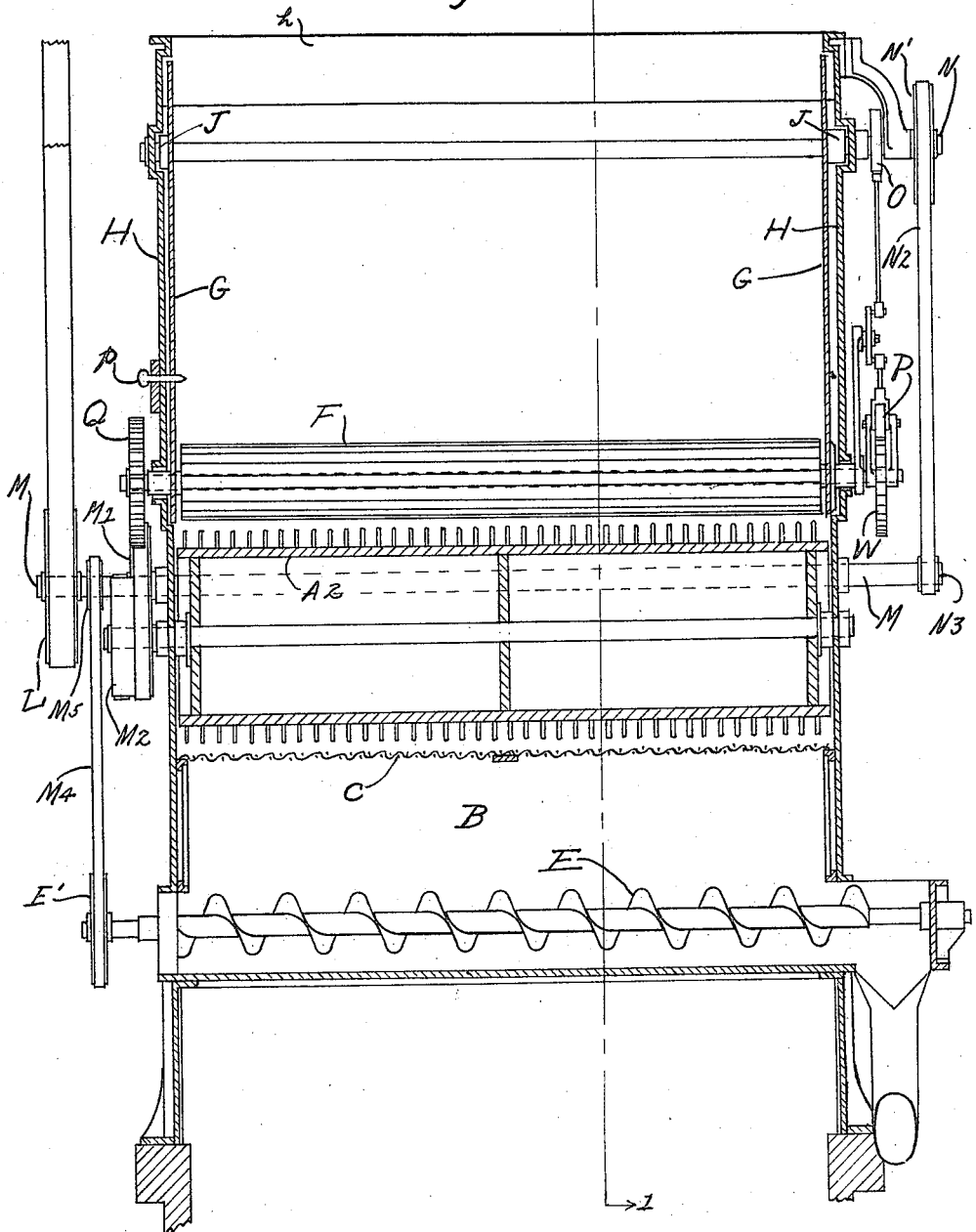

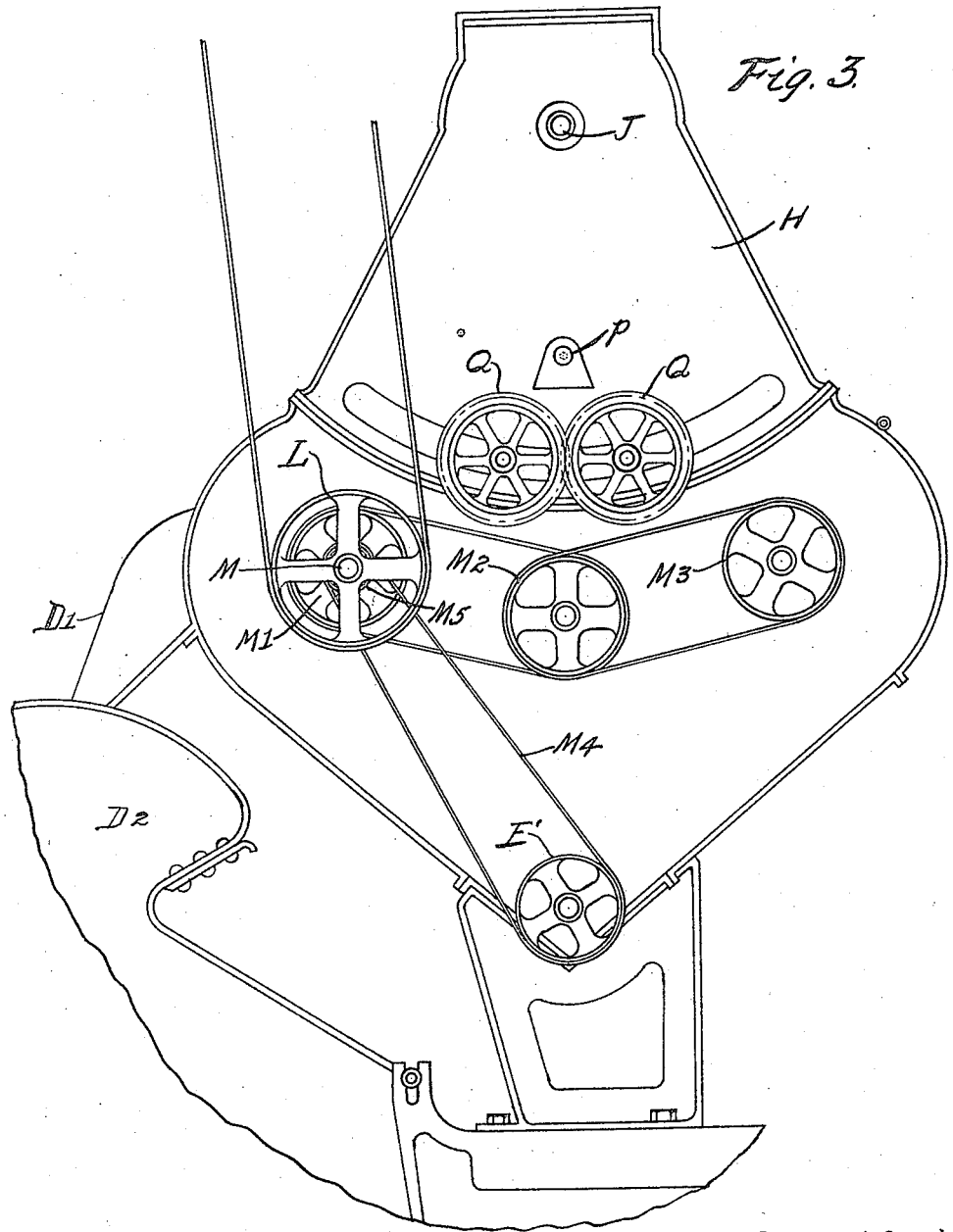

1,478,594

UNITED STATES PATENT OFFICE.

BRONSON C. WOODFORD, OF DALLAS, TEXAS, ASSIGNOR TO THE MURRAY COMPANY, OF DALLAS, TEXAS, A CORPORATION OF TEXAS.

CLEANER FEEDER FOR COTTON GINS.

Application filed March 8, 1923. Serial No. 623,792.

*To all whom it may concern:*

Be it known that I, BRONSON C. WOODFORD, a citizen of the United States, residing at Dallas, in the county of Dallas and State of Texas, have invented certain new and useful Improvements in Cleaner Feeders for Cotton Gins, of which the following is a specification.

My invention is an improved horizontal, multi-cylinder cleaner-feeder for cotton gins, my object being to provide a feeder-cleaner, capable by selective adjustment of the feed thereof, of giving a varying amount of screening to the cotton being worked, in accordance with the special needs of the particular cotton, as to content of sand, trash, etc. and other conditions, it being understood that the screening process is not desirable or beneficial in itself, except as conditions of dirt, etc., render it necessary and therefore beneficial.

In the drawings:

Figure 1 is a cross-sectional elevation of my improved feeder-cleaner, on line 1—1 of Figure 2;

Figure 2 is a longitudinal, sectional elevation of the machine, on line 2—2, looking from the right, in Figure 1; and Figure 3 is an end elevation of the machine, looking from the left in Figure 2.

The operation of the feeder or feeder-cleaner for cotton-gins is well known in the art and need not be described at length.

From a source of seed-cotton supply, a cotton elevator and distributor or distributor belt conveys the seed-cotton to an opening, $h$, in the top of the casing H beneath which the feeder-cleaner is disposed so that seed-cotton falls through chute G on to the feed rolls F. The chute G is hung on pivots J within the casing H, so that the chute may be swung and secured, as by pin $p$, to direct the seed-cotton to any one of the beater cylinders or drums $A^1$, $A^2$, $A^3$. I have shown in the drawings three such drums but more may be employed if desired. The seed-cotton falling on the rolls F is engaged by the rolls, turning as indicated by the arrows in Fig. 1, and is fed between the rolls in a slightly compressed bat. The rolls F are geared together by gears Q shown conventionally in Fig. 3 and are commonly actuated intermittently, step by step, by a ratchet wheel W and pawl P, operated by an eccentric O on shaft N, which in turn is operated by a pulley $N^1$, and belt $N^2$ from a pulley $N^3$ on the end of drum shaft M of the machine.

As the seed-cotton passes downward from the feed rolls F it is engaged by one of the spiked drums $A^1$, $A^2$, $A^3$, according to the adjustment of the chute G, the drums turning in the direction indicated by the arrows in Figure 1, and the cotton is carried around over the screen C which follows the contours of the drums at a suitable distance, to the exit opening D through which it passes to the chute D' and the gin indicated at $D^2$. The dirt and trash is beaten and shaken through the screens C to the inside of the casing B, down which it slides, preferably to a screw-conveyor, E, by which the dirt is conveyed out of the mechanism.

The drums $A^1$, $A^2$, $A^3$ are actuated from a power source by a driven pulley L on shaft M which shaft carries drum $A^1$, the drums $A^2$, $A^3$ being belted through pulleys $M^1$, $M^2$, $M^3$ and driven in unison with drum $A^1$. A belt $M^4$ from a pulley $M^5$ on shaft M to a pulley E' drives screw conveyor E.

When the chute G is adjusted to deliver to drums $A^1$ or $A^3$ it is obvious that an opening would be left in the top of the casing B. I therefore provide hinged covers K which may be let down to cover this opening.

The operation is as follows: Seed-cotton entering the upper end of the chute G falls on rolls F and is by them fed downward at a predetermined rate. In the case of extremely dirty seed-cotton the chute G is swung to the right in Figure 1, to deliver to drum $A^3$ which receives the cotton and urges it over screen C to a point $C^1$ where it comes under the influence of drum $A^2$ which receives the cotton and urges it over screen C to a point $C^2$ where it comes under the influence of drum $A^1$ by which it is urged over screen C to the exit opening D, out of which it passes. When the cotton does not require the use of all three drums, the chute G is adjusted as in Fig. 1 and the belt to pulley $M^3$ is removed. The cotton is now received by drum $A^2$ and passed down to the screen, along which it is urged to point $C^2$ where it is taken by drum $A^1$. When it is desired to use only drum $A^1$ the belt to pulley $M^2$ from $M^1$ is removed and the chute G adjusted to deliver to drum $A^1$ which passes the cotton to the screen C and exit D. When drums $A^2$ or $A^3$ are idle the incoming cotton fills the surface on the side adjacent to the moving drum forming a smooth wall against which the incoming loose bat is urged downward by the moving drum.

In the operation which I have described, the seed cotton is beaten and rubbed over the screens and the sand and trash is forced through the screens to the interior of the casing B and finds its way to the screw conveyor E for removal from the machine, or, if no screw conveyor is provided, the dirt and sand may be moved in any desired fashion.

I claim:

1. In a multi-cylinder cotton cleaner, the combination of a series of beater drums, arranged horizontally with faces parallel with adjacent drums, for cooperative action, within a screened casing; that casing; a movable feed chute, above the drum casing, adjustable to feed cotton at any point along the series of drums, to vary the amount of cleaning action.

2. In a multi-cylinder cotton cleaner, the combination of a series of beater drums, arranged horizontally with faces parallel with adjacent drums, for cooperative action, within a screened casing; that casing; a swinging feed chute, above the drum casing, adjustable to feed cotton at any point along the series of drums, to vary the amount of cleaning action.

3. As in claim 1, the movable feed chute having rotating feed rolls at its delivery end to feed the cotton at a predetermined rate.

Signed at Dallas, Texas, this 12th day of February, 1923.

BRONSON C. WOODFORD.